United States Patent
Reinmuth

[11] Patent Number: 6,032,173
[45] Date of Patent: Feb. 29, 2000

[54] SYNCHRONIZATION OF A COMPUTER SYSTEM HAVING A PLURALITY OF PROCESSORS

[75] Inventor: Armin Reinmuth, Waghaeusel, Germany

[73] Assignee: Siemens Aktiengesellschaft, Munich, Germany

[21] Appl. No.: 08/347,341

[22] PCT Filed: Jun. 1, 1993

[86] PCT No.: PCT/DE93/00471

§ 371 Date: Dec. 6, 1994

§ 102(e) Date: Dec. 6, 1994

[87] PCT Pub. No.: WO93/25966

PCT Pub. Date: Dec. 23, 1993

[30] Foreign Application Priority Data

Jun. 10, 1992 [DE] Germany .............................. 42 19 005

[51] Int. Cl.[7] ..................................................... G06F 9/00
[52] U.S. Cl. .......................................................... 709/106
[58] Field of Search ...................... 395/800; 364/DIG. 1, 364/DIG. 2; 375/200; 709/106

[56] References Cited

U.S. PATENT DOCUMENTS

| | | | |
|---|---|---|---|
| 4,316,245 | 2/1982 | Luu et al. | 364/200 |
| 4,589,066 | 5/1986 | Lam et al. | 364/200 |
| 4,985,831 | 1/1991 | Dulong et al. | 364/200 |
| 5,239,641 | 8/1993 | Horst | 395/550 |
| 5,276,828 | 1/1994 | Diom | 395/425 |
| 5,361,369 | 11/1994 | Kametani | 395/800 |
| 5,371,896 | 12/1994 | Gove et al. | 395/800 |
| 5,388,242 | 2/1995 | Jewett | 395/425 |
| 5,430,850 | 7/1995 | Papadopoulos et al. | 395/375 |

*Primary Examiner*—Paul R. Myers
*Attorney, Agent, or Firm*—Kenyon & Kenyon

[57] ABSTRACT

A computer system has several interconnected processors each associated with a memory. The memories all have a common storage area to which the processors have access. In order to synchronize changes in the state of operation of the processors and/or to handle processors jobs in a synchronous manner, the first processor to reach a predetermined synchronization point writes a data set in the common storage area, causing interrupt controllers associated with the processors to generate interrupt signals and to initiate changes in the state of operation or synchronous job processing. The invention has applications in multiple processor systems, redundant computer systems and stored program control systems.

3 Claims, 2 Drawing Sheets

SYNCHRONIZATION OF A COMPUTER SYSTEM HAVING A PLURALITY OF PROCESSORS

BACKGROUND OF THE INVENTION

The present invention relates to a computer system having several interconnected processors each associated with a memory, the memories all having a common storage area to which the processors have access.

In computer systems having several processors, which, for example, communicate with one another via a bus and jointly execute different tasks, it is necessary to synchronize the processing. This means that a change of a processor state of operation to another state of operation and/or the execution of system jobs or rather user jobs by the processors must be handled in a synchronous manner.

DE-OS 39 11 407 discloses a redundant computer system having several processors each associated with a memory. In each memory, a storage area is associated with each computer into which storage area the relevant computer enters data. Each computer reads out the data from its associated memory areas and supplies the data it reads out to a voter which performs a voter-based evaluation and reports any possible deviation in the supplied data as an error. During normal operation, the same data are present nine times and the lines to the memory units must be laid out three times.

SUMMARY OF THE INVENTION

The present invention is to simplify the known computer system in the interest of synchronization of changes in the state of operation of the processors and/or synchronous job processing.

In accordance with the present invention, to synchronize changes in the state of operation of the processors and/or to handle processor jobs in a synchronous manner, the first processor to reach a predetermined synchronization point during execution of a process enters a data set into the storage area and interrupt controllers associated with the processors detect a change in the data set, generate interrupt signals and feed them to the processors so that a change in the state of operation of the processors and/or synchronous job processing is initiated.

Time critical changes in the state of operation and/or synchronous job processing are carried out immediately after initiation. After initiation, all non-time-critical changes in the state of operation are then carried out simultaneously when all of the processors have reached corresponding synchronization points during their process execution.

BRIEF DESCRIPTION OF THE DRAWINGS

Based on the exemplary embodiments depicted in the drawings, the present invention will be explained along with its refinements and advantages.

DETAILED DESCRIPTION

Figure 1:
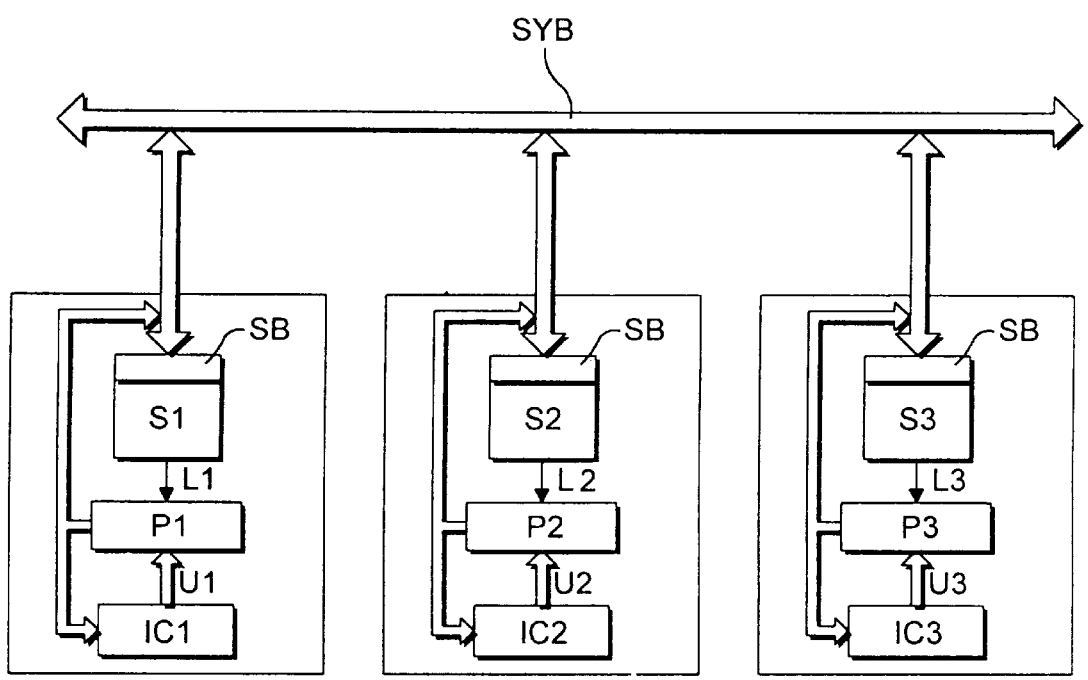
FIG. 1 illustrates a block diagram of a computer system.

In FIG. 1, processors of central processing units of a computer system are designated as P1, P2, P3 and a memory S1, S2, S3 is associated with each of these processors, respectively. These processors P1, P2, P3 are interconnected via a system bus SYB which is equipped with data, address and control lines that are known per se. The memories S1, S2, S3 all have a common storage area SB to which the processors P1, P2, P3 have read access via respective lines L1, L2, L3, whereas write accesses take place via the system bus SYB. Three programmable interrupt controllers belonging to the respective processors P1, P2, P3 are designated as IC1, IC2, IC3. These interrupt controllers detect a change in a data set stored in the storage area SB during a write access, generate interrupt signals and feed them to the associated processors P1, P2, P3 via lines U1, U2, U3. If a processor P2, P3 which reaches a synchronization point during its execution of a process writes a data set into the storage area SB, thereby changing the data set that was already stored, the interrupt controllers generate an interrupt signal. The processors change their current state of operation as a result and/or simultaneously start the execution of system jobs or user jobs.

Figure 2:
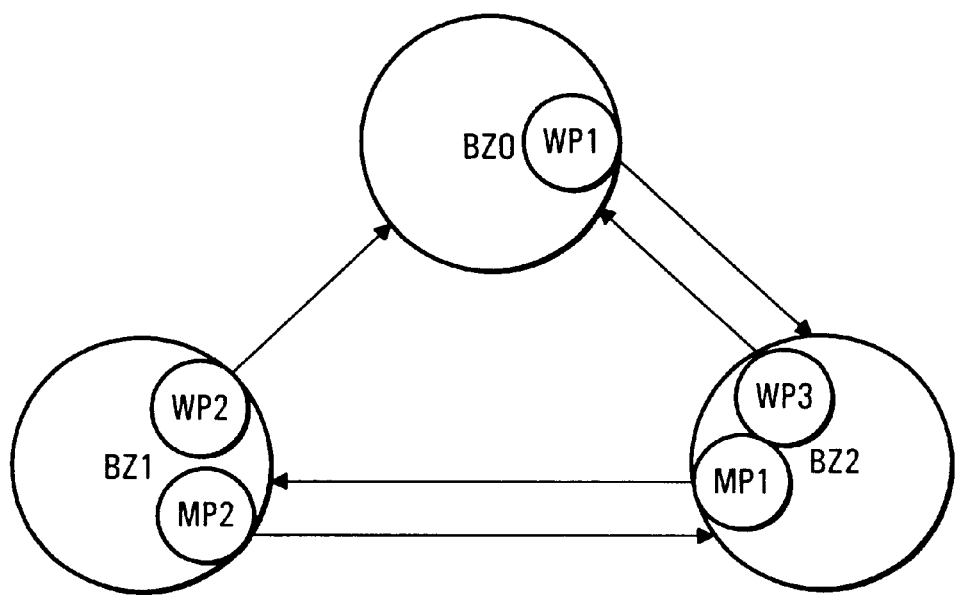
FIG. 2 illustrates states of operation and synchronization points of a processor.

To clarify the synchronization of the change in a state of operation, FIG. 2 shows states of operation BZ0, BZ1, BZ2 and synchronization points in the form of so-called message points MP1, MP2 and wait points WP1, WP2, WP3 of a processor. The states of operation BZ0, BZ1, BZ2 can represent, for example, the states "Stop", "Halt" "Start" or "RUN". Non-time-critical changes in the state of operation, which all processors execute simultaneously, are designated by the wait points WP1 . . . WP3 and time-critical changes in the state of operation, which take place in a time-minimal manner, by the message points MP1, MP2. In the case where all processors P1, P2, P3 are in the state of operation BZ2 and the processor P1 reaches the message point MP1 during execution of a process, this processor changes the data set in the common storage area SB. The interrupt controllers IC1, IC2, IC3 detect this change and apply an interrupt signal to the processors P1, P2, P3 in response, causing the processors to interrupt the current process they are executing in a command-granular manner [on a command-by-cotmmand basis] and change to the state of operation BZ1. Thus, the request to change the state of operation is issued by the processor P1 in the present example, whereas the remaining processors P2 and P3 immediately carry out this request.

In the case of a non-time-critical change in the state of operation, e.g., for starting a user program, this change is executed simultaneously by all processors. If, for example, all processors are in the state of operation BZ0 and processor P2 reaches the wait point WP1, then this processor changes the data set stored in storage area SB and thereby indicates that a change in the state of operation is to take place from BZ0 to BZ2. Processor P2 continues executing its process, and a change to the state of operation BZ2 is not executed until or unless the processors P1 and P3 also reach this wait point WP1 during their execution of a process.

Figure 3:
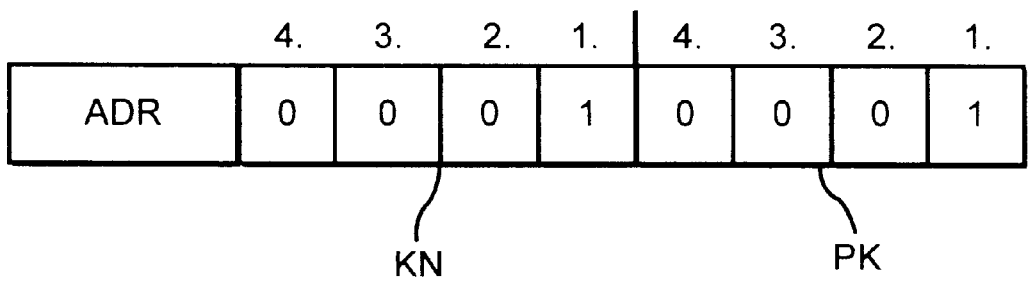
FIG. 3 illustrates the structure of a common storage area.

FIG. 3 shows the structure of a common storage area. Using an address ADR, the processors P1, P2, P3 access the storage area SB (FIG. 1). This area consists of a first sub-area KN in which the synchronization points are entered and a second sub-area PK in which the identifiers of the processors are entered respectively using an encoded format. In the present example, the sub-areas KN, PK are each four bits wide. It is assumed that the storage area which can be addressed using the address ADR is provided for time-critical synchronization points, i.e., for the message points MP1, MP2, and the processor P1 has reached the message point MP1 during its execution of a process. This processor P1 enters the code for the message point MP1 in the form of a "1" at the first location of this sub-area KN and its processor identifier, also in the form of a "1", at the first location of the sub-area PK. If the processors P1, P2, P3 have the current state of operation BZ2, this entry now causes, with the help of the interrupt controller, the processors P1, P2, P3 to change to the state of operation BZ1 (FIG. 2). Once this change is carried out, the processors P2 and P3 read out the data set from their respective storage area SB and check, based on the processor identifier which is entered, whether all the processors connected to the computer system carried out the change in the state of operation. If, for example, the processor P2 reads out the data set stored in the storage area SB, then it detects that only the processor P1 has reached the message point MP1. In response, the processor P2 enters its identifier into the sub-area PK in the form of a "1" at the second location of the range PK and executes the process to be executed for this state of operation. The processor P3 also reads out the data set and now detects that the processors P1 and P2 have reached the message point MP1 and carried out the change. In response, the processor P3 deletes this data set, and the storage area SB can be written to for a new change in the state of operation. When the entire data set is deleted or rather the content of the sub-area PK is changed, the interrupt controllers IC1, IC2, IC3 do not generate an interrupt signal to change the states of operation.

In the case where a non-time-critical change in the state of operation is carried out, e.g., if the processors P1, P2, P3 are in the state of operation BZ0 and the processor P3 reaches the wait point WP1, the change to the state of operation BZ2 is not carried out immediately. The processor P3 first enters, as was described for the example of the time-critical change in the state of operation, the wait point WP1 into the sub-area KN following the addressing of the storage area SB and also enters its identifier into the sub-area PK. The remaining processors read out this data set after they have also reached this wait point and check, based on the processor identifiers already stored, whether all other processors incorporated into the system have reached this wait point WP1. If all processors have not reached the wait point WP1, the processor currently accessing the storage area SB enters its processor identifier, waits for the change to be enabled by the interrupt controller using an interrupt signal and possibly continues process execution on a command-by-command and interruptible basis in the state of operation BZ0. In the case where all processors incorporated into the system have already reached this wait point WP1, the last processor to access this storage area deletes the content of this area. Unlike the time-critical change in the state of operation, a simultaneous change of all processors to the state of operation BZ2 is triggered by the deleting of the data set.

In the case where both system jobs as well as user jobs are to be simultaneously started, the processor outputting a job writes the job number of the job to be started into the sub-area KN in encoded format and, in turn, writes its processor identifier into the second sub-area PK at the end of execution of the job. This change in the data set in the form of the job output into the sub-area KN leads, in a manner analogous to the time-critical change in a state of operation already described, in each processor to the halting of the program currently running and to the starting of the corresponding job.

In order to distinguish whether the synchronization of a time-critical or a non-time-critical change in the state of operation of the processors or synchronous job processing is to be carried out, the data set stored in the storage area SB has additional bit positions for encoding the synchronization forms. It is also practical to proceed such that three common storage areas are provided for the various forms of the synchronization which storage areas can be accessed with [using] different addresses. The interrupt controllers IC1, IC2, IC3 are programmed accordingly to detect, based on the access address applied to the system bus SYB, how the synchronization is to be carried out in order to promptly generate the necessary interrupt signals. Moreover, the various synchronization forms are provided with different priorities and the highest priority is assigned to the time-critical change in the state of operation.

What is claimed is:

1. A computer system comprising:

a plurality of interconnected processors;

a plurality of memories each one associated with one of said interconnected processors, each having a common storage area to which each of said processors have write access;

a plurality of interrupt controllers, each one associated with one of said processors;

wherein, to synchronize changes in the state of operation of the processors and/or to handle processor jobs in a synchronous manner, a data set is able to be entered into said common storage area of each of said plurality of memories by the processor that first reaches a predetermined synchronization point during execution of a process;

wherein said interrupt controllers detect a change in said data set, said controllers providing interrupt signals that are fed to said processors, through which means, according to an identifier in the entry in the common storage area, a change in the state of operation of said processors and/or a synchronous job processing is able to be initiated; and means for indicating to said processors whether the synchronization of a change in the state of operation or the synchronization of processor job is time-critical or non-time-critical.

2. The computer system of claim 1, wherein time-critical changes in the state of operation of the processors and/or the synchronous job processing are able to be carried out immediately after initiation.

3. The computer system of claim 1, wherein after their initiation, non-time-critical changes in the state of operation are able to be carried out simultaneously when all processors have reached the corresponding synchronization points during the process execution.

* * * * *